(12) United States Patent
Doi et al.

(10) Patent No.: US 9,218,912 B2
(45) Date of Patent: Dec. 22, 2015

(54) ELECTROCHEMICAL CAPACITOR

(71) Applicant: Panasonic Corporation, Osaka (JP)

(72) Inventors: Shotaro Doi, Osaka (JP); Hideki Shimamoto, Kyoto (JP); Susumu Nomoto, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 221 days.

(21) Appl. No.: 13/957,435

(22) Filed: Aug. 2, 2013

(65) Prior Publication Data

US 2013/0314846 A1   Nov. 28, 2013

Related U.S. Application Data

(63) Continuation of application No. PCT/JP2012/001017, filed on Feb. 16, 2012.

(30) Foreign Application Priority Data

Feb. 17, 2011   (JP) ................. 2011-031582

(51) Int. Cl.
*H01G 9/00* (2006.01)
*H01G 9/02* (2006.01)
*H01G 9/028* (2006.01)
*H01G 11/58* (2013.01)

(52) U.S. Cl.
CPC ............... *H01G 9/028* (2013.01); *H01G 11/58* (2013.01); *Y02E 60/13* (2013.01); *Y02T 10/7022* (2013.01)

(58) Field of Classification Search
USPC .......................................... 361/502; 252/62.2
See application file for complete search history.

(56) References Cited

U.S. PATENT DOCUMENTS

| 6,349,028 | B1 | 2/2002 | Komatsu | |
|---|---|---|---|---|
| 2010/0128415 | A1* | 5/2010 | Ando et al. | 361/505 |

FOREIGN PATENT DOCUMENTS

| CN | 1277728 | 12/2000 |
|---|---|---|
| JP | 2005-093377 | 4/2005 |
| JP | 2007-067105 | 3/2007 |
| JP | 2008-300684 | 12/2008 |

(Continued)

OTHER PUBLICATIONS

International Search Report of PCT Application No. PCT/JP2012/001017 dated Feb. 16, 2012.

(Continued)

*Primary Examiner* — Eric Thomas
(74) *Attorney, Agent, or Firm* — Panasonic Patent Center

(57) ABSTRACT

An electrochemical capacitor includes electrolytic solution, a capacitor element, and a housing. The electrolytic solution contains cations, anions, solvent formed of materials other than lactones, and a lactone component. The capacitor element includes a negative electrode, a positive electrode, and a separator. The negative electrode includes an electrode layer capable of storing the cations, and the positive electrode includes a polarizable electrode layer and confronts the negative electrode. The separator is disposed between the negative and positive electrodes, and they are layered or wound together. The capacitor element is impregnated with the electrolytic solution. The housing accommodates the capacitor element and the electrolytic solution that contains the lactone component in a quantity ranging from 0.001 wt % to 5 wt % (inclusive) relative to the solvent.

6 Claims, 5 Drawing Sheets

(56) References Cited

FOREIGN PATENT DOCUMENTS

| JP | 2009-218191 | | | 9/2009 |
|----|-------------|---|---|--------|
| JP | 2009218191 | A | * | 9/2009 |

OTHER PUBLICATIONS

English Translation of Chinese Search Report dated Jul. 1, 2015 for the related Chinese Patent Application No. 201280009022.3.

* cited by examiner

— 1 —

ELECTROCHEMICAL CAPACITOR

BACKGROUND

1. Technical Field

The technical field relates to an electrochemical capacitor to be used for regenerating a backup power supply of electronic devices, hybrid cars, and fuel-cell powered cars, or for storing electric power.

2. Background Art

FIG. 5A is a horizontal sectional view of a conventional electrochemical capacitor. FIG. 5B is a partially cutaway front view of electrode wound unit 100 of the conventional electrochemical capacitor.

The conventional electrochemical capacitor includes electrode wound unit 100, lithium metals (lithium electrodes) 104, 105, and outer container 106. Electrode wound unit 100 is formed of positive electrode 101, negative electrode 102, and separator 103 disposed between electrodes 101 and 102. These elements are layered and wound together concentrically, thereby forming electrode wound unit 100. Lithium metals 104 and 105 are disposed as lithium-ion suppliers on the outer periphery and the center of electrode wound unit 100, respectively. Electrode wound unit 100, lithium metals 104, 105, and electrolytic solution (not shown) are accommodated in outer container 106 made of aluminum or iron.

Each of positive electrode 101 and negative electrode 102 includes a collector as a core member, and the collector is made of porous material having holes penetrating through the material from the front face to the rear face. The collector will be detailed later. Use of the porous collector enables the lithium ions to move freely from lithium metals 104 and 105 through the holes of the respective collectors of positive electrode 101 and negative electrode 102 although lithium metals 104 and 105 are disposed separately on the outer periphery and at the center of electrode wound unit 100. This structure thus allows every portion of negative electrode 102 of electrode wound unit 100 to be pre-doped in advance with the lithium ions.

The collectors of positive electrode 101 and negative electrode 102 are respectively connected with electrode terminals 107, 108, which are led out in opposite directions from each other and along a winding axis direction of cylindrical electrode-wound unit 100. Lithium metal 105 disposed at the center of electrode wound unit 100 is supported by tubular stick 109 that also works as a shaft stick for supporting electrode wound unit 100.

The outermost face of electrode wound unit 100 is rigidly taped up with tape 110 in order to keep the unit 100 wound.

As discussed above, the foregoing conventional electrochemical capacitor includes two lithium-ion suppliers, i.e. one on the outer periphery and the other at the center of electrode wound unit 100. This structure allows pre-doping negative electrode 102 with the lithium ions faster than a structure where one lithium-ion source supplies the lithium ions for pre-doping.

SUMMARY

An electrochemical capacitor according to embodiments includes electrolytic solution, a capacitor element, and a housing. The electrolytic solution contains cation, anion, solvent, and a lactone component. Preferably, the solvent does not include any lactone. The capacitor element includes a negative electrode, a positive electrode, and a separator. The negative electrode has an electrode layer that stores the cation. The positive electrode has a polarizable electrode layer and confronts the negative electrode. The separator is disposed between the positive electrode and the negative electrode. The positive electrode, negative electrode, and separator are layered or wound together. The capacitor element is impregnated with the electrolytic solution. The housing accommodates the electrolytic solution and the capacitor element. The electrolytic solution contains the lactone component within the range from 0.001 wt % to 5 wt % inclusive relative to the solvent.

The foregoing structure reduces a change in electric potential of the negative electrode during a quick charge or discharge. As a result, a capacitor energy density of the electrochemical capacitor can be increased.

DETAIL DESCRIPTION OF PREFERRED EMBODIMENTS

Figure 5A:
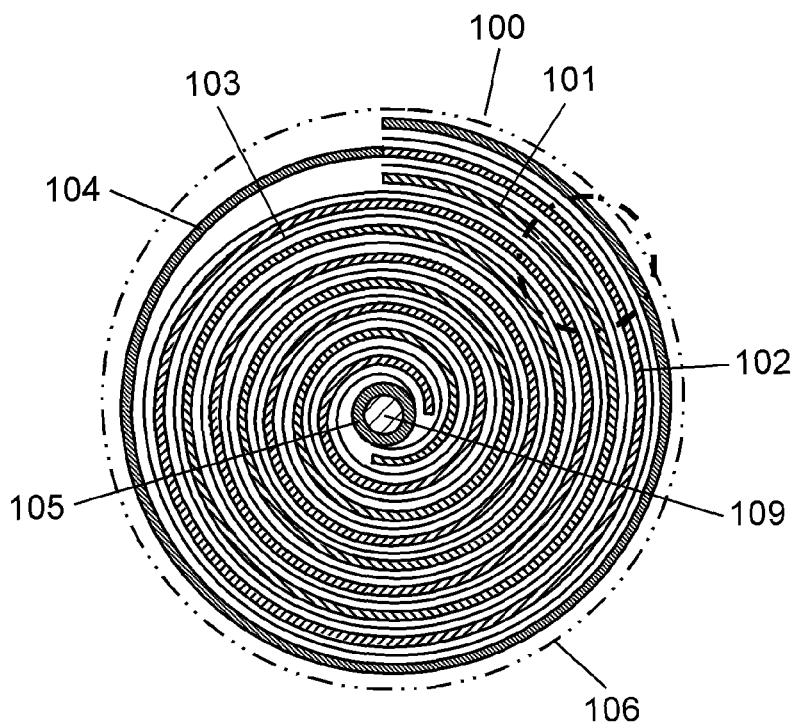
FIG. 5A is a horizontal sectional view of a conventional electrochemical capacitor.
Figure 5B:
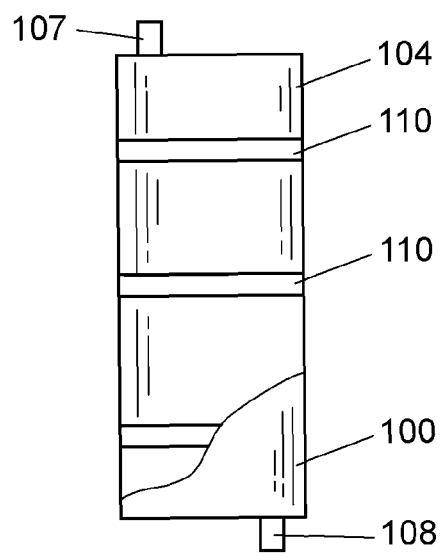
FIG. 5B is a partially cut-away front view of an electrode wound unit used in the conventional electrochemical capacitor.

Description is provided first of some problems associated with the conventional structure shown in FIGS. 5A and 5B prior to the detailed discussion of exemplary embodiments.

When the electrochemical capacitor has repeatedly undergone rapid charges and discharges, an electric potential of the negative electrode rises, and a potential difference between the positive and negative electrodes may decrease. This decrease can cause the energy density per volume of the electrochemical capacitor to be lowered.

The rise in electric potential of the negative electrode causes the lithium stored in advance in an electrode layer of the negative electrode to separate out. The separated lithium will break the separator and cause a short circuit.

Figure 1:
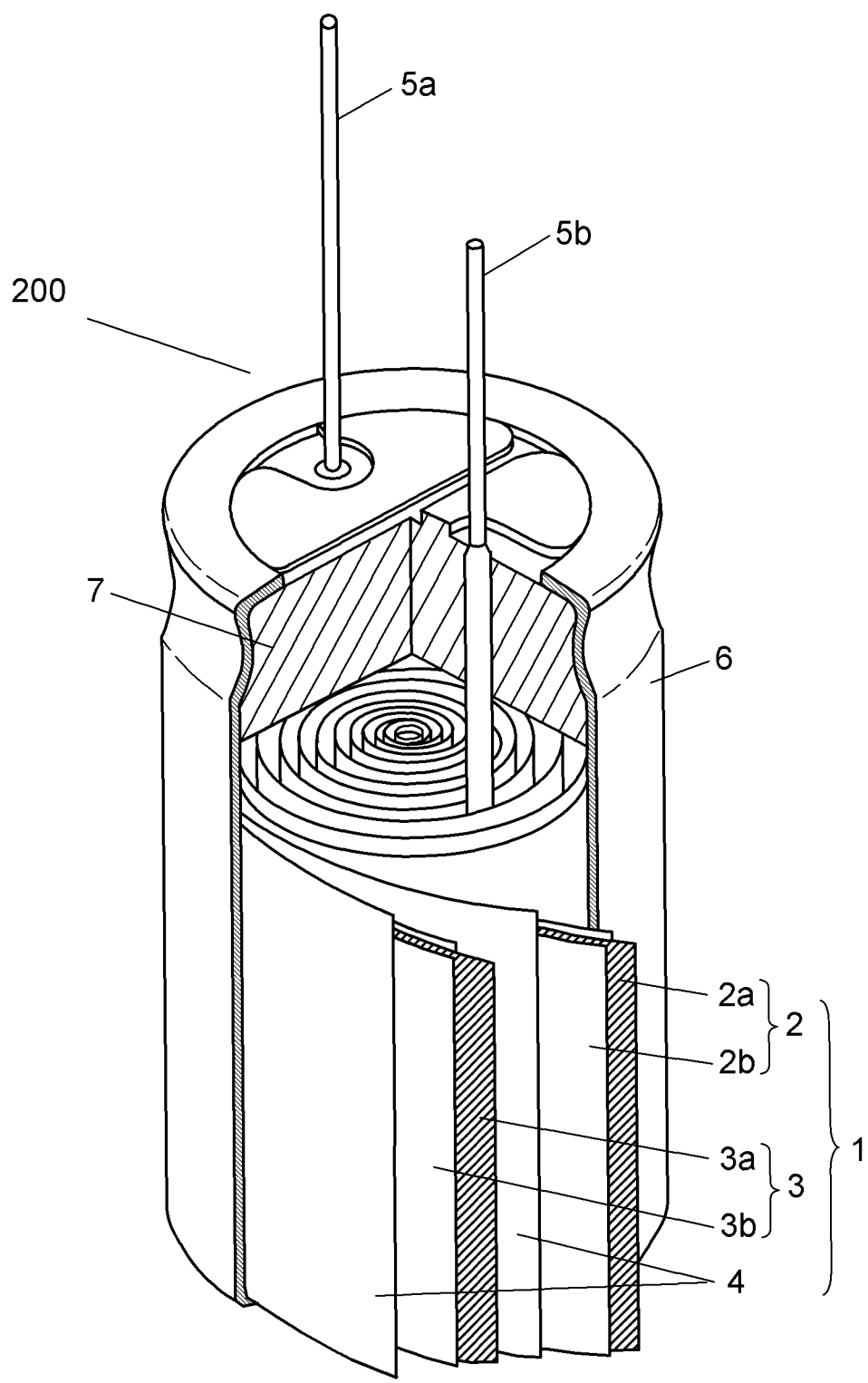
FIG. 1 is a perspective cut-away view of an electrochemical capacitor in accordance with an embodiment.

Referring now to FIGS. 1 to 4, description will be provided of exemplary embodiments of an electrochemical capacitor. FIG. 1 is a perspective cut-away view of an electrochemical capacitor in accordance with the embodiment.

Electrochemical capacitor 200 includes capacitor element 1, electrolytic solution (not shown), housing 6 having a bottom and accommodating capacitor element 1 together with the electrolytic solution. Capacitor element 1 has positive electrode 2, negative electrode 3 confronting positive electrode 2, and separator 4 disposed between positive electrode 2 and negative electrode 3. Positive electrode 2 includes collector 2a made of metal, and polarizing electrode 2b formed on a surface of collector 2a. Polarizing electrode 2b is formed of active carbon and other materials. The active carbon works as a positive electrode layer for adsorbing and desorbing ions. Negative electrode 3 includes collector 3a made of copper, and negative electrode layer 3b, which is formed on a surface of collector 3a and works as an electrode layer in which lithium ions have been stored. Negative electrode layer 3b includes mainly carbon material. The carbon material has a multilayered crystal structure. In the crystal structure, the layers are arranged to have a predetermined distance between an adjacent two layers. Positive electrode 2 and negative electrode 3 are wound together with separator 4 disposed therebetween. Lead-wires 5a, 5b, working as electrode leading terminals, are connected to the surfaces of positive electrode 2 and negative electrode 3, respectively. Sealing member 7 is disposed in housing 6 such that lead-wires 5a, 5b are exhibited from the opening of housing 6, whereby electrochemical capacitor 200 is sealed.

A method for manufacturing electrochemical capacitor 200 is demonstrated hereinafter. This method is an example for achieving the present embodiment; however, the present embodiment is not limited to the method discussed below.

To begin with, a manufacturing step of positive electrode 2 is demonstrated hereinafter.

A high-purity aluminum foil (containing aluminum over 99%) having a thickness about 15 µm is used as collector 2a. This aluminum foil is put into a chlorine-based etching solution, and the foil is provided with electrolytic etching for roughening the surface of the aluminum foil.

Thereafter, polarizable electrode layers 2b are formed on both the roughened surfaces of collector 2a. The materials for polarizable electrode layer 2b can be active carbon, binder, conduction assistant.

For instance, phenol-resin based active carbon having an average particle size of 5 µm can be employed as the active carbon, an aqueous solution of carboxymethyl-cellulose (CMC) can be employed as the binder, and acetylene black can be employed as the conduction assistant. The active carbon, binder, and conduction assistant are mixed at the weight ratio of 10:2:1. This mixture is kneaded with a kneading machine for obtaining a paste having a given viscosity.

This paste is applied onto both the surfaces of collector 2a, and collector 2a is stayed in the air at 100° C. to be dried, whereby polarizable electrode layers 2b each having a thickness of 40 µm are obtained. Thereafter, collector 2a on which polarizable electrode layer 2b is formed is cut with slits to have a pre-determined width.

Further, a part of polarizable electrode layers 2b is removed from both the surfaces of collector 2a, and then lead-wire 5a is connected to the exposed surfaces by crimping, whereby positive electrode 2 is obtainable.

Next, a manufacturing step of negative electrode 3 is described hereinafter.

A copper foil having a thickness of about 15 µm is used as collector 3a. Negative electrode layers 3b are formed on both the surfaces of collector 3a. The materials for negative electrode layer 3b can be as follows: carbon material that can reversibly store and emit lithium ions, e.g. graphitizable carbon; acetylene black as the conduction assistant as used in positive electrode 2, and a mixture of polytetra-fluoroethylene (PTFE) and the CMC at a weight ratio of 4:1 as the binder.

The CMC, acetylene black, graphitizable carbon, and PTFE are put into water in this order, and then agitated and kneaded to form paste. The mixed ratio of these materials is: graphitizable carbon:conduction assistant:binder=8:1:1.

This paste is disposed with a comma-coater or a die-coater on both sides of collector 3a such that a thickness thereof on each side becomes approx. 50 µm, and then dried in the air at 80° C. Then the resultant collector 3a undergoes a press process at a line pressure of 75-100 kgf/cm. The thickness of negative electrode layer 3b on one side is thus adjusted to 40 µm and the density thereof is adjusted to 0.4-1.0 g/cm$^3$. Thereafter, collector 3a on which negative electrode layer 3b is formed is cut with slits to have a pre-determined width.

As it has been done to positive electrode 2, a part of negative electrode layers 3b formed on the surfaces of collector 3a is removed, and then lead-wire 5b made of copper is connected by a resistance welding method to collector 3a at the exposed surface. Negative electrode 3 is thus completed.

Next, lithium films (not shown) are formed on both sides of negative electrode layer 3b of negative electrode 3. Each of the lithium films is made by a physical vapor-phase method. The lithium, material for the lithium films, will work as a source of lithium ions to be stored in the carbon material during the pre-doping step. In this embodiment, a vacuum vapor method is employed as the physical vapor-phase method.

An element manufacturing step of capacitor element 1 is demonstrated hereinafter. Separator 4 is disposed between positive electrode 2 and negative electrode 3 manufactured by the foregoing steps. Separator 4 is made of cellulose-based paper having a thickness of approx. 35 µm and a density of 0.45 g/cm$^3$. Positive electrode 2, separator 4, negative electrode 3, and separator 4 are layered in this order, and then this layered product is wound to form capacitor element 1.

Capacitor element 1 thus manufactured is accommodated together with the electrolytic solution in housing 6. Next, an accommodation step in which capacitor element 1 and the electrolytic solution are accommodated into housing 6 is described.

The electrolyte contained in the electrolytic solution preferably contains lithium ions as electrolytic cation and anion containing fluorine atoms, considering the characteristics of withstand voltage, as electrolytic anion. It is more preferable to employ $BF_4^-$ or $PF_6^-$ as the electrolytic anion. The solvent contained in the electrolytic solution can employ materials other than lactones. For instance, it is preferable to employ a mixed solvent of ethylene carbonate (EC) of high dielectric constant and dimethyl-carbonate (DMC) of low viscosity. They are mixed at the weight ratio of 1:1.

The electrolytic solution should contain a lactone component as additive at the weight ratio of 0.01 wt %-5 wt % inclusive relative to the solvent.

Housing 6 is made from metal, e.g. aluminum, copper, or nickel, for the better heat dissipation. However, the metal is not limited to particular ones as far as they do not react so much to the electrolytic solution. Housing 6 can be a square-rod type or a laminate type.

Next, the pre-doping step that enables negative electrode 3 to occlude lithium ions is demonstrated hereinafter.

The pre-doping means storing lithium ions in negative electrode layer 3b of negative electrode 3 in advance. The carbon material for negative electrode layer 3b of negative electrode 3 has a multilayered crystal structure. Storing in this embodiment expresses the phenomenon that the lithium ions around negative electrode 3 intercalate the layers of the carbon material and form an intercalation compound of carbon atoms and lithium atoms.

When the lithium ions are stored in negative electrode 3, the electric potential of negative electrode 3 is lowered due to the electrochemical reaction of the lithium ions. As a result, a difference in electric potential between positive electrode 2 and negative electrode 3 becomes greater, and the energy density of the electrochemical capacitor can be increased.

Meanwhile, the pre-doping of the lithium ions into negative electrode 3, i.e. storing the lithium ions in negative electrode 3 in advance, is done also in the field of lithium-ion secondary battery. However, the pre-doping in the field of the electrochemical capacitor has a different object from that in the field of the lithium-ion secondary battery. The pre-doping in the field of the lithium-ion secondary battery aims to reduce an irreversible capacity during charge and discharge cycles, thereby increasing a capacity of charge and discharge.

On the other hand, the pre-doping in the field of the electrochemical capacitor aims to increase the voltage by lowering the electric potential of negative electrode 3. A stored amount of lithium ions during the pre-doping differs from each other according to the difference of these objects. To be more specific, the stored amount of lithium ions of the secondary battery can be small enough only for the irreversible capacity of negative electrode 3, so that it can be remarkably smaller than the stored amount of lithium ions for the electrochemical capacitor.

The method for pre-doping the lithium ions is to form a lithium metal film on the surface of negative electrode 3; however, the method is not limited to this one. For instance, a lithium-ion metal film is deposited on a sheet-like substrate, and the metal film is bonded to the surface of negative electrode 3, and then the substrate is removed. This is one of transferring methods. Here is another method: capacitor element 1 is immersed in the electrolytic solution in which lithium ions are used as cations, and then a voltage is applied between positive electrode 2 and negative electrode 3 of capacitor element 1, whereby the lithium ions in the electrolytic solution can be stored in the carbon material. The pre-doping method is thus not limited to the one discussed here.

In this embodiment, as discussed above, the negative electrode 3 having the metal lithium layer (not shown) on the surface is immersed in the electrolytic solution where the lithium ions are used as cations, so that the lithium of the metal lithium layer is brought into contact with the electrolytic solution, and then the lithium is ionized. The lithium ions are stored between layers of multilayered crystal structure. As a result, the electric potential of negative electrode 3 lowers.

The impregnation of negative electrode 3 with the electrolytic solution for a given time allows the lithium of the metal lithium layer formed on negative electrode 3 to be stored in a given amount into the carbon material. The pre-doping step is thus completed.

Next, the sealing step is demonstrated hereinafter. Lead-wires 5a, 5b mounted to capacitor element 1 are put into through-holes provided to sealing member 7, and then sealing member 7 is placed at the opening of cylindrical housing 6 having a bottom. Housing 6 is drawn inward at an outer wall thereof corresponding to the place where sealing member 7 is placed. The drawing process compresses sealing member 7 and press-fits it onto an inner wall of housing 6, whereby sealing member 7 is fixed there. The opening of housing 6 is thus sealed, and the sealing step is completed.

Finally, the electrochemical capacitor 200 thus fabricated is provided with an aging process for maintaining the quality, and confirming whether or not the initial characteristics are satisfied.

Electrochemical capacitor 200 is thus completed.

This capacitor employs the electrolytic solution in which a lactone component is mixed at 0.1 wt %-5 wt % inclusive. Use of this electrolytic solution allows promoting the following reaction (marked with CHE-1) near negative electrode layer 3b. As a result, a balance of charge and discharge between positive electrode 2 and negative electrode 3 becomes stable, so that an electric potential increment caused by rapid charging or discharging can be reduced and the energy density of capacitor 200 can be increased.

$$Li^+ + e^- \rightarrow Li$$

$$Li + C \rightarrow LiC \qquad \text{CHE-1}$$

Negative electrode 3 can repeatedly be charged and discharged by storing and emitting cations into/from negative electrode layer 3b. When the cations are stored into negative electrode layer 3b, other materials present in capacitor element 1 are also stored into negative electrode layer 3b. This phenomenon is called a joint insertion. Some materials stored by this joint insertion can expand the interlayer spaces of the multilayered crystal structure that forms active materials, e.g. carbon material, for the negative electrode. The expansion of the interlayer spaces allows expanding an entrance between the layers, so that solvated lithium ions near layer 3b tend to move as expressed in CHE-1 easily. As a result, the lithium ions are easily stored into the active materials for the negative electrode, and tend to be alloyed with carbon atoms.

In this embodiment, the lactone component in an extremely small quantity mixed with the electrolytic solution is inserted into negative electrode layer 3b due to the joint insertion discussed above, and the lactone component seems to expand the interlayer spaces of the layered crystal structure of the active materials for the negative electrode.

The electrolytic solution in this embodiment contains a limited quantity of the lactone component such as in the range of 0.001 wt %-5 wt % inclusive relative to the solvent. A greater quantity of the lactone component than the foregoing range will not only expand the interlayer spaces of the active materials for the negative electrode, but also break the interlayer structure, and sometimes result in lowering the capacity contrary to the expectation. On the other hand, a smaller quantity of the lactone component than 0.001 wt % will not fully expand the interlayer spaces, and result in poor effect. The quantity of the lactone component to be added to the electrolytic solution should fall within the foregoing range in order to successfully expand the interlayer spaces of the crystal structure of the active materials for the negative electrode. It is more preferable to add the lactone component to the solvent in a range of 0.1 wt %-5 wt %. This quantity will reduce the rise in electric potential of the negative electrode more effectively.

The lactone component to be used is not limited to specific ones; however, they preferably have penta-cyclic lactone structure (five-membered ring lactone structure) or hexa-cyclic lactone structure (six-membered ring lactone structure). The lactones having the penta-cyclic lactone structure include, e.g. γ-butyrolactone, γ-valerolactone, and γ-caprolactone. The lactones having the hexa-cyclic lactone structure include, e.g. δ-valerolactone, δ-caprolactone.

In addition to the foregoing lactone component, the acid selected from hydroxybutyric acid and hydroxyvaleric acid is preferably added to the electrolytic solution in the range from 0.00001 wt % to 3 wt % inclusive relative to the solvent. This constitution allows reducing gases produced in housing 6 of electrochemical capacitor 200, because the hydroxybutyric acid or the hydroxyvaleric acid contained in the electrolytic solution works as weak acid, which enables the water in an extreme small amount around negative electrode 3, of which electric potential is lowered by the doping, to resist being alkalinized. The gases produced by this alkalization of the water in the electrolytic solution can be thus reduced. As a result, the electrolytic solution can be prevented from decreasing, because the decrease is caused by the production of the gases. The electrolytic solution can be also prevented from being blocked with respect to the electrode layer, because the block is caused by the gases stored in the electrolytic solution.

The electrolytic solution preferably employs two kinds of solvent having different viscosities. The lower viscosity preferably falls within a range from $6.0 \times 10^{-4}$ to $8.0 \times 10^{-4}$ Pa·S (under 25° C.). The solvent having the foregoing lower viscosity includes carbonates, e.g. dimethyl-carbonate, ethylmethyl-carbonate, propylene-methyl carbonate, diethyl-carbonate. Sulfur compounds, e.g. sulfolane or sulfoxide can be also used.

The foregoing structure enables the lithium ions around negative electrode 3 to enter or exit the negative electrode 3 with more ease, so that deposition of lithium metal on negative electrode 3 can be prevented. The reason are these: Use of the solvent, formed of two kinds of solvents having different viscosities, enables the electrolytic solution to maintain a given conductivity and to resist being vaporized, so that the electrolytic solution can convey the ions fast. The joint insertion of the lactone component into negative electrode 3 allows widening the interlayer spaces in parts of the carbon material having the multilayered crystal structure, so that the ions and the solvent can intercalate and deintercalate faster.

Performance Evaluation Test

Figure 2:
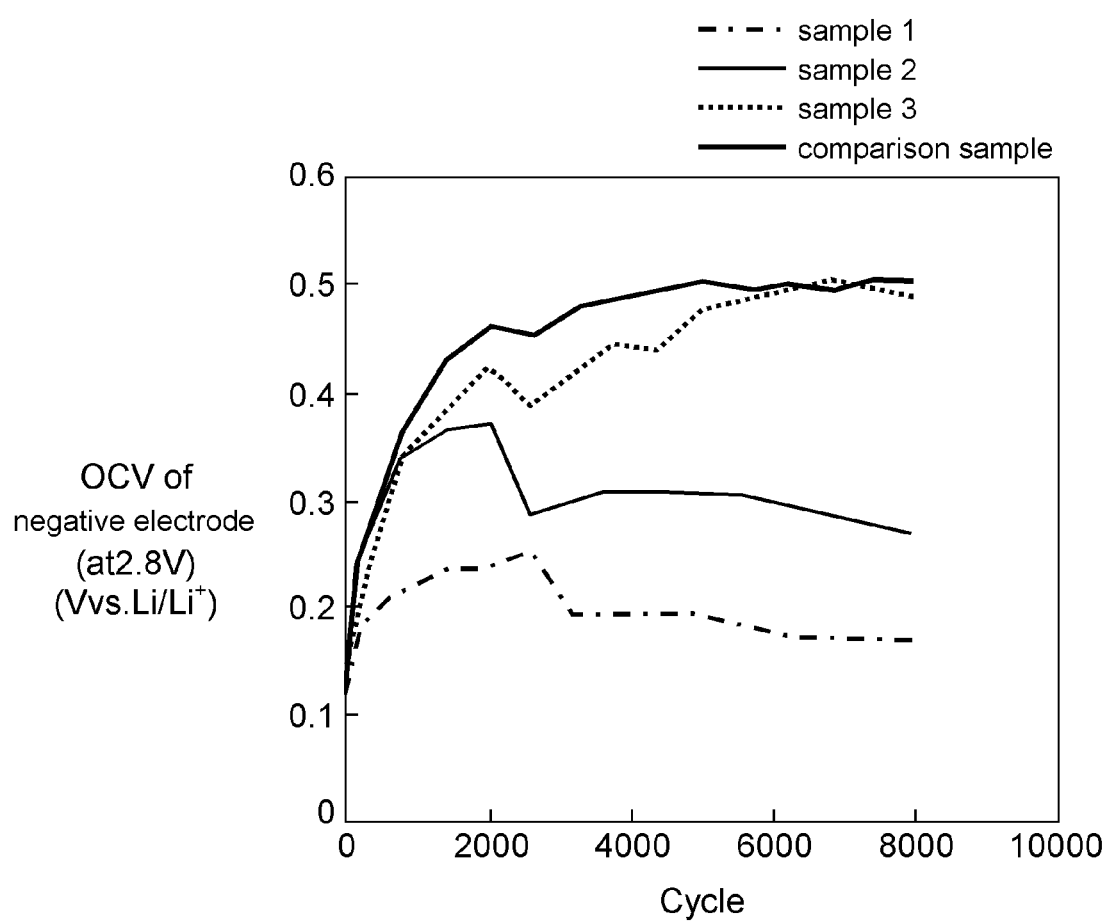
FIG. 2 shows characteristics of electric potential rise of the electrochemical capacitors in accordance with the embodiment and those of a comparison sample.

FIG. 2 shows the result of test for confirming the advantages of the present embodiment by evaluating samples in accordance with the embodiment and a comparison sample.

For the evaluation test, samples of electrochemical capacitor 200 in accordance with the embodiment and a sample for the comparison purpose are produced, and both of these samples undergo a cycle test under the following charge-discharge condition. Changes in electric potential of the negative electrodes of these samples are evaluated with respect to the number of cycles.

Sample 1 of electrochemical capacitor 200 has the following structure: Collectors 2a, 3a of positive electrode 2 and negative electrode 3 have dimensions of 3 cm×4 cm. Alkaline-activating active carbon is used as active carbon contained in polarizable electrode layer 2b of positive electrode 2, and graphitizable carbon is used as carbon material contained in negative electrode layer 3b of negative electrode 3. Electrolytic solution is formed of mixed product of solvent, electrolyte, and additive. This solvent is produced by mixing EC and DMC together at a ratio of 1:1, and the electrolyte employs $LiPF_6$ of 1 mol/l, and the additive employs γ-butyrolactone in an amount of 2 wt % relative to the solvent.

Sample 2 of electrochemical capacitor 200 employs γ-valerolactone instead of γ-butyrolactone of sample 1 in an amount of 2 wt % relative to the solvent.

Sample 3 of electrochemical capacitor 200 employs γ-caprolactone instead of γ-butyrolactone of sample 1 in an amount of 2 wt % relative to the solvent.

The comparison sample of electrochemical capacitor 200 has the same constitution as sample 1 except that no lactone is added.

The conditions of the cycle test are this: upper limit voltage is 4V, lower limit voltage is 2.8V, charge condition is 0.5 A CCCV (constant current/constant voltage), and discharge condition is 0.25 A CCCV. These conditions correspond to the charge and discharge at 900 C-1000 C.

As shown in FIG. 2, samples 1-3 in accordance with the embodiment encounter smaller rises in electric potential of the negative electrodes along with increments in the cycle, than the comparison sample.

Figure 3:
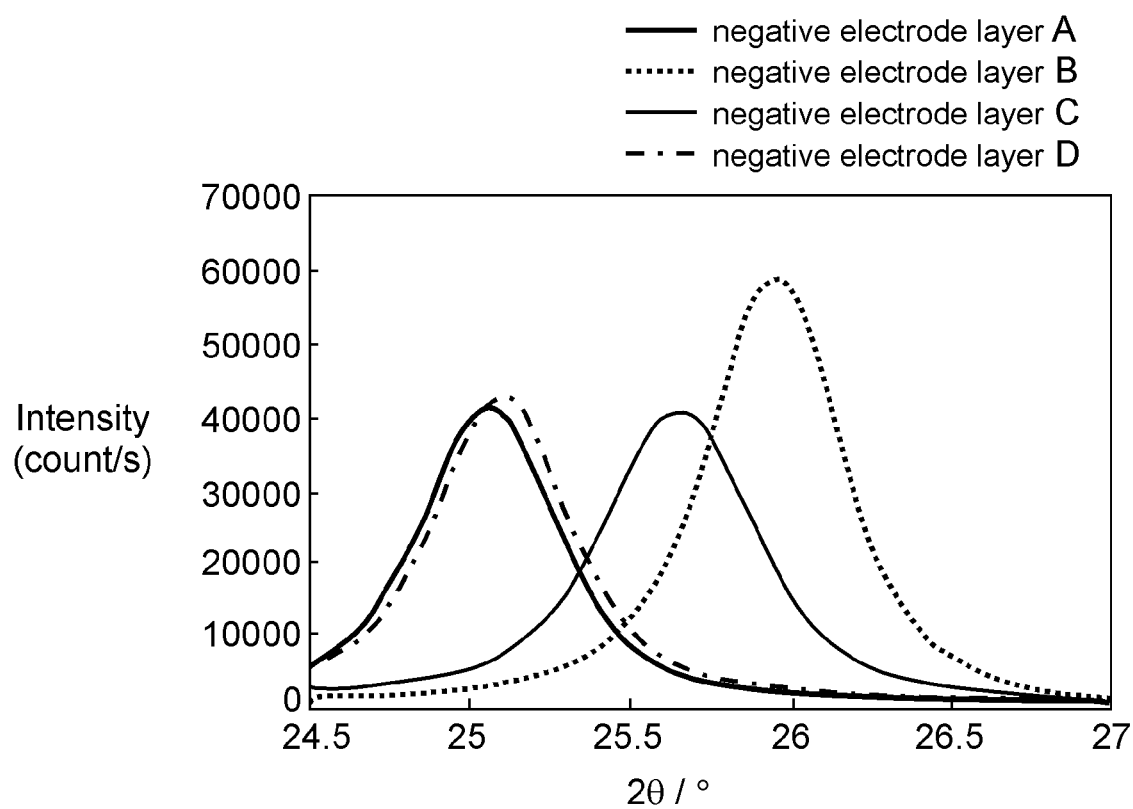
FIG. 3 is an X-ray diffraction measurement diagram that measures an interlayer distance of active material of the negative electrodes used in the electrochemical capacitors in accordance with the embodiment and in the comparison sample.

FIG. 3 shows results of investigating the crystal structure on the surface of the carbon material by X-ray diffraction. Negative electrode layers A-D are measured by the X-ray diffraction. Layer A is negative electrode layer 3b of sample 1, and layer B is negative electrode layer 3b of the comparison sample. Layer C is negative electrode layer 3b which is impregnated with the electrolytic solution formed by mixing DMC and γ-butyrolactone together at the ratio of 1:1. Layer D is not impregnated with the electrolytic solution. Negative electrode layers A-C have undergone initial charge, and then interlayer spaces of them are measured and compared. Layer C cannot be charged up to a given level to which layers A and B can be charged up.

As shown in FIG. 3, negative electrode layer A has a smaller diffraction angle than layer B. This fact proves that the interlayer spaces of negative electrode layer 3b have been expanded. Therefore, it is understood that the lactone component in an extreme small quantity added to the electrolytic solution thus allows expanding the interlayer spaces of the crystal structure of the carbon material that forms negative electrode layer 3b.

Figure 4:
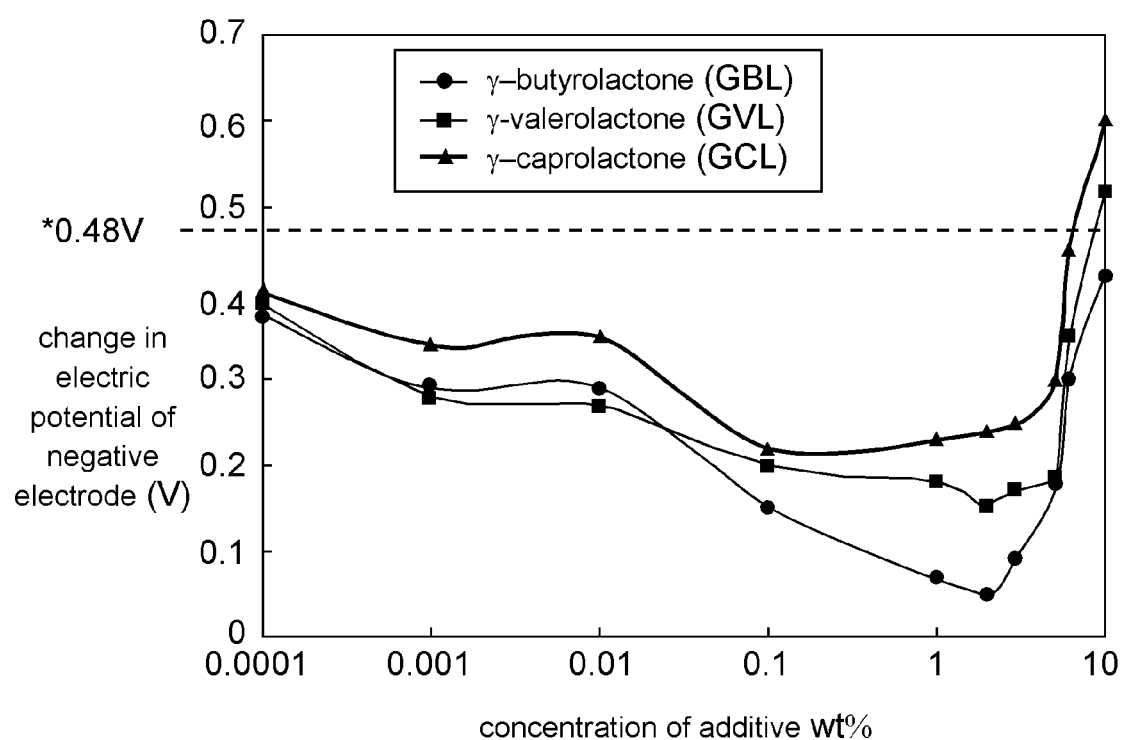
FIG. 4 is a characteristics diagram illustrating relations between changes in added amounts of various lactones and changes in electric potential of the negative electrode of the electrochemical capacitor in accordance with the embodiment.

Table 1-Table 3 show the characteristics of capacitors in which the quantities of additives, i.e. γ-butyrolactone, γ-valerolactone, and γ-caprolactone, are changed. FIG. 4 summarizes the results shown in Table 1-Table 3.

The values of cycle characteristics shown in Table 1-Table 3 are the percentages of characteristics of each cell after the cycle test vs. those of each cell in the initial state. ΔE shown in Table 1-Table 3 refers to as a difference in electric potential of the negative electrode between before the cycle test and after the cycle test.

TABLE 1

| GBL additive concentration wt % | cell characteristics | | cycle characteristics (25° C._8000 cycle) | | ΔE (e.p. of negative electrode) V |
|---|---|---|---|---|---|
| | DC-R Ω | capacitance F | DC-R % | capacitance % | |
| 0 | 0.79 | 1.58 | 121 | 97 | 0.48 |
| 0.0001 | 0.81 | 1.451633 | 120 | 96 | 0.38 |
| 0.001 | 0.8 | 1.5 | 110 | 97 | 0.29 |
| 0.01 | 0.78 | 1.52 | 112 | 97 | 0.29 |
| 0.1 | 0.72 | 1.43 | 106 | 99.1 | 0.15 |
| 1 | 0.69 | 1.45 | 106 | 99.2 | 0.07 |
| 2 | 0.6 | 1.5 | 103 | 99 | 0.05 |
| 3 | 0.72 | 1.52 | 102 | 99.1 | 0.09 |
| 5 | 0.75 | 1.42 | 110 | 98.9 | 0.18 |
| 6 | 0.99 | 1.45 | 135 | 97 | 0.3 |
| 10 | 1.6 | 1.39 | 180 | 95 | 0.42 |
| 50 | 2.5 | 1.2 | not measurable | not measurable | not measureable | e.p. = electric potential

TABLE 2

| GVL additive concentration | cell characteristics | | cycle characteristics (25° C._8000 cycle) | | |
|---|---|---|---|---|---|
| | | | | | ΔE (e.p. of negative |
| wt % | DC-R Ω | capacitance F | DC-R % | capacitance % | electrode) V |
| 0 | 0.79 | 1.58 | 121 | 97 | 0.48 |
| 0.0001 | 0.81 | 1.451633 | 120 | 96 | 0.39 |
| 0.001 | 0.8 | 1.52 | 115 | 96 | 0.28 |
| 0.01 | 0.72 | 1.32 | 111 | 94 | 0.27 |
| 0.1 | 0.7 | 1.35 | 106 | 97 | 0.2 |
| 1 | 0.69 | 1.45 | 102 | 99 | 0.18 |
| 2 | 0.7 | 1.43 | 103 | 98 | 0.15 |
| 3 | 0.7 | 1.52 | 99 | 99 | 0.17 |
| 5 | 0.72 | 1.53 | 101 | 97 | 0.19 |
| 6 | 0.95 | 1.32 | 109 | 95 | 0.35 |
| 10 | 1 | 1.12 | 130 | 90 | 0.52 |
| 50 | not measurable | Not measurable | not measurable | not measurable | not measurable |

TABLE 3

| GCL additive concentration | cell characteristics | | cycle characteristics (25° C._8000 cycle) | | |
|---|---|---|---|---|---|
| | | | | | ΔE(e.p. of negative |
| wt % | DC-R Ω | capacitance F | DC-R % | capacitance % | electrode) V |
| 0 | 0.79 | 1.58 | 121 | 97 | 0.48 |
| 0.0001 | 0.81 | 1.451633 | 120 | 96 | 0.4 |
| 0.001 | 0.89 | 1.54 | 115 | 96 | 0.34 |
| 0.01 | 0.86 | 1.44 | 115 | 97 | 0.35 |
| 0.1 | 0.82 | 1.4 | 109 | 102 | 0.22 |
| 1 | 0.81 | 1.48 | 108 | 100 | 0.23 |
| 2 | 0.8 | 1.42 | 105 | 101 | 0.24 |
| 3 | 0.9 | 1.5 | 108 | 98 | 0.25 |
| 5 | 1 | 1.38 | 109 | 97 | 0.3 |
| 6 | 2 | 1.21 | 150 | 90 | 0.45 |
| 10 | 3.4 | 1.03 | 200 | 80 | 0.6 |
| 50 | not measurable | Not measurable | not measurable | not measurable | not measurable |

FIG. 4 and Table 1-Table 3 show that not only γ-butyrolactone but also γ-valerolactone and γ-caprolactone as the additives, within the range from 0.001 wt % to 5 wt %, to the electrolytic solution of the electrochemical capacitor markedly reduce the changes in electric potential of the negative electrodes.

Next, samples 4-6 are produced for the evaluation. These samples contain hydroxybutyric acid in a quantity shown in Table 4 additionally to the structures of samples 1-3. Table 4 shows the evaluation result. The lactone component are added to samples 4-6 in the quantity of 2.0 wt %. Increments in volume shown in Table 4 are measured this way: The electrochemical capacitors to be used in the measurement have a positive and negative electrodes of which respective collectors have dimensions of 3 mm×4 mm, electrolytic solution with the constitution shown in Table 4 containing the above-mentioned lactone component, and a laminated film of 90 mm square accommodating the positive and negative electrodes and the electrolytic solution therein. This electrochemical capacitor undergoes the cycle test, and an increment in the volume in a housing made of laminated film is measured before the cycle test and after the cycle test. The increment in the volume can be evaluated by measuring the changes of the water quantity overflowing from a water tank, into which the samples of the capacitor are put, before and after the cycle test.

TABLE 4

| content of hydroxyl butyric acid wt % | GBL added Increment in volume (cc) | GVL added Increment in volume (cc) | GCL added Increment in volume (cc) |
|---|---|---|---|
| 0 | 0.2100 | 0.2560 | 0.2490 |
| 0.0000001 | 0.1530 | 0.2153 | 0.2230 |
| 0.00001 | 0.0280 | 0.0450 | 0.0580 |
| 0.0001 | 0.0210 | 0.0311 | 0.0321 |
| 0.001 | 0.0110 | 0.0200 | 0.0330 |
| 0.01 | 0.0120 | 0.0106 | 0.0270 |
| 0.1 | 0.0101 | 0.0166 | 0.0256 |
| 1 | 0.0111 | 0.0172 | 0.0229 |
| 2 | 0.0180 | 0.0185 | 0.0280 |
| 3 | 0.0150 | 0.0210 | 0.0350 |
| 5 | 0.0236 | 0.0335 | 0.0580 |
| 10 | 0.0780 | 0.0980 | 0.1800 |

Table 4 shows that use of samples 4-6 employing hydroxybutyric acid in the quantity ranging from 0.00001 wt % to 3 wt % (inclusive) relative to the solvent results in the smaller increment in cell volume than samples 1-3 that do not contain the hydroxybutyric acid in the foregoing range. The addition of hydroxybutyric acid or hydroxyvaleric acid in the foregoing range thus reduces gases produced inside of the electrochemical capacitor, and improves the reliability.

This embodiment employs graphitizable carbon as the material for the carbon material because this material has a small resistance and is excellent in charge-discharge cycle life. However, other materials, e.g. graphite carbon, low-temperature fired carbon, or hard carbon material can be used. For instance, the graphite carbon is excellent in a high withstanding voltage and a small energy loss in charge-discharge cycle. The low-temperature fired carbon is excellent in a great capacity and a small resistance. The hard carbon material is excellent in a great capacity and a small loss in cycle. It is desirable that these materials should be selected based on their features.

As discussed above, electrochemical capacitor 200 in accordance with the embodiment contains a lactone component in the quantity ranging from 0.001 wt % to 5 wt % (inclusive) in electrolytic solution. This constitution enables both the lactone component and cations to enter negative electrode 3, whereby reaction around electrode layer 3b of negative electrode 3 is promoted. This mechanism allows stabilizing the balance of charge and discharge between positive electrode 2 and negative electrode 3, so that electric potential changes produced during quick charges and discharges at negative electrode 3 can be reduced, and an energy density can be made greater.

The electrochemical capacitor of the present embodiment provides an excellent energy density even when quickly charged and discharged. The capacitor thus can be useful for a power supply, to be used for regeneration or as a backup power supply, of a hybrid car.

What is claimed is:

1. An electrochemical capacitor comprising:
an electrolytic solution containing cation, anion, and solvent;
a capacitor element impregnated with the electrolytic solution, and including a negative electrode having an electrode layer capable of storing the cation, a positive electrode confronting the negative electrode, and a separator disposed between the positive electrode and the negative electrode; and
a housing accommodating the electrolytic solution and the capacitor element,
wherein the electrolytic solution includes a lactone component in a quantity ranging from 0.001 wt % to 5 wt % inclusive relative to the solvent, and
the electrolytic solution further includes acid formed of at least one of hydroxybutyric acid and hydroxyvaleric acid in a quantity ranging from 0.00001 wt % to 3 wt % inclusive relative to the solvent.

2. The electrochemical capacitor of claim 1, wherein the lactone component has a pentacyclic or hexacyclic lactone structure.

3. The electrochemical capacitor of claim 2, wherein the lactone component is at least one of γ-butyrolactone, γ-valerolactone, and γ-caprolactone.

4. The electrochemical capacitor of claim 1, wherein the solvent includes organic solvent of which viscosity falls within a range from $6.0 \times 10^{-4}$ PaS to $8.0 \times 10^{-4}$ PaS inclusive.

5. The electrochemical capacitor of claim 1, wherein the positive electrode further includes a polarizable electrode layer.

6. The electrochemical capacitor of claim 1, wherein the electrode layer of the negative electrode is made of carbon, wherein the cation stored in the electrode layer includes lithium ions predoped in the carbon of the negative electrode.

* * * * *